(12) United States Patent
Hastings et al.

(10) Patent No.: US 11,566,553 B1
(45) Date of Patent: Jan. 31, 2023

(54) HYDROACTIVE VORTEX SCRUBBER AND REACTOR

(71) Applicants: Nathan Hastings, Dallas, TX (US);
Stephan Hastings, Hemet, CA (US)

(72) Inventors: Nathan Hastings, Dallas, TX (US);
Stephan Hastings, Hemet, CA (US)

(*) Notice: Subject to any disclaimer, the term of this patent is extended or adjusted under 35 U.S.C. 154(b) by 377 days.

(21) Appl. No.: 16/932,139

(22) Filed: Jul. 17, 2020

(51) Int. Cl.
*B01D 47/06* (2006.01)
*F01N 3/28* (2006.01)
*B01D 53/38* (2006.01)
*B01D 53/88* (2006.01)
*F01N 3/04* (2006.01)
*B01D 53/18* (2006.01)

(52) U.S. Cl.
CPC .......... *F01N 3/2882* (2013.01); *B01D 47/06* (2013.01); *B01D 53/185* (2013.01); *B01D 53/38* (2013.01); *B01D 53/88* (2013.01); *F01N 3/04* (2013.01); *F01N 2290/06* (2013.01)

(58) Field of Classification Search
CPC ...... F01N 3/2882; F01N 3/04; F01N 2290/06; B01D 47/06; B01D 53/185; B01D 53/38; B01D 53/88
USPC ........................................................ 422/168
See application file for complete search history.

(56) References Cited

U.S. PATENT DOCUMENTS

| | | | |
|---|---|---|---|
| 7,056,367 B2 | 6/2006 | Trivett | |
| 8,501,126 B1 | 8/2013 | Hastings et al. | |
| 9,346,017 B2 * | 5/2016 | Greber | F01N 3/2066 |
| 9,506,386 B2 * | 11/2016 | Brunel | B01J 19/24 |
| 9,849,424 B2 * | 12/2017 | Davidson | B01D 53/9495 |
| 10,337,380 B2 * | 7/2019 | Willats | F01N 13/10 |
| 10,933,387 B2 * | 3/2021 | Cvelbar | B01D 53/9431 |
| 11,313,266 B2 * | 4/2022 | Tucker | F01N 13/00 |
| 2007/0193255 A1 * | 8/2007 | Satou | B01F 23/2132 60/303 |
| 2012/0216513 A1 * | 8/2012 | Greber | F01N 3/2066 60/295 |
| 2015/0152766 A1 * | 6/2015 | Brunel | F01N 3/2013 422/148 |
| 2016/0319723 A1 * | 11/2016 | Alano | B01F 25/4314 |

* cited by examiner

*Primary Examiner* — Tom P Duong
(74) *Attorney, Agent, or Firm* — Law Office of Sam Sokhansanj PLLC

(57) ABSTRACT

A hydro-active scrubber and reactor (HSR) system and apparatus is disclosed that includes a main body, an inlet configured to receive a first fluid medium comprised of pollutant particles, and a nozzle configured to dispense a second fluid medium within the main body. In addition, the HSR system and apparatus may also include a cylindrical body or hydro-vortex generator within the main body having a plurality of horizontally positioned rods projecting therefrom, wherein the cylindrical body further comprises a plurality of openings. Further, the HSR system and apparatus can include a motor configured to rotate the cylindrical body thereby directing the first and second fluid mediums through the cylindrical body. In addition, a first area within the main body can receive the pollutant particles from the first fluid medium, and a first outlet within the main body can be configured to direct the received pollutant particles out of the main body.

15 Claims, 7 Drawing Sheets

HYDROACTIVE VORTEX SCRUBBER AND REACTOR

BACKGROUND

This section is intended to introduce the reader to aspects of art that may be related to various aspects of the present disclosure described herein, which are described and/or claimed below. This discussion is believed to be helpful in providing the reader with background information to facilitate a bet-ter understanding of the various aspects of the present disclosure described herein. Accordingly, it should be understood that these statements are to be read in this light, and not as admissions of prior art.

Exhaust gases are generated in many industrial and transportation applications. Environmental concerns as well as industrial consequences of release of pollutants or contaminants require their elimination or reduction. There are many examples of specific instances where a scrubber is desirable for removing elements from exhaust gases. For example, it may be desired to remove gaseous and fine particulate matter contaminants, odorous compounds and other undesirable elements from exhaust gases emanating from combustion of fossil fuels, whether they be gas, fuel oil, diesel oil, or other petroleum products. Further, in some instances, the use of a water scrubbing medium is also desired to discourage or eliminate spark emission.

Devices currently in use for removal of pollutants include cyclones, bag filters, electrostatic precipitators, and high energy scrubbers. A common method of scrubbing, for example, exhaust gases, is to spray a scrubbing medium, such as water, across the exhaust gas passage, or to force the exhaust gases through a continuously fed curtain of water, or along a channel with wetted sides. However, the conventional methods and systems for scrubbing exhaust gases are highly inefficient and further have high capital costs and high energy and maintenance costs.

One device that utilizes the shedding vortex is a dynamic mandrel catalytic reactor. The mandrel catalytic reactor employs a different methodology then that of the disclosure described herein, namely, among other reasons, the rotating mandrel is plated with a catalyst and the shifting vortex specifically manipulates flow to interact with its self/same surface (i.e. the notion of a mandrel which is to hold an object in a shape or fixture so that work may be performed on it). The mandrel holds the catalyst in a preferred shape such that the shifting vortex may do the work of sweeping the surface of the catalyst plated mandrel clean in order that the mandrel surface may be as reactive to the flow past it as possible. The problem with this method is that all moving surfaces exposed to fluid develop a boundary layer that insulates the same surfaces from being acted upon.

Hence, what is needed is a more efficient and effective method of cleaning or scrubbing various fluids, gasses, pollutants, and contaminants.

BRIEF SUMMARY

In one aspect of the disclosure described herein, a fluid cleaning apparatus is disclosed. The fluid cleaning apparatus can include a main body, an inlet configured to receive a first fluid medium comprised of pollutant particles, a nozzle configured to dispense a second fluid medium within the main body. In addition, the fluid cleaning apparatus may also include a cylindrical body or hydro-vortex generator within the main body having a plurality of horizontally positioned rods projecting therefrom, wherein the cylindrical body further comprises a plurality of openings. In addition, the apparatus can include a motor configured to rotate the cylindrical body thereby directing the first and second fluid mediums through the cylindrical body. Further, a first area within the main body can receive the pollutant particles from the first fluid medium, and a first outlet within the main body can be configured to direct the received pollutant particles out of the main body. In addition, the cylindrical body can include an interior open space, and wherein the rods further project within the interior open space of the cylindrical body. Further, the first area can further include a particle absorbing media. In addition, the fluid cleaning apparatus can also include a fan configured to direct the fluid medium through a process chamber. The process chamber can include a spiral or helical configuration. The fluid cleaning apparatus can also include a second outlet coupled to the process chamber configured to direct the fluid medium through the second outlet. The second outlet can be further connected to another fluid cleaning apparatus in series or in parallel. The motor and cylindrical body can also be suspended from an upper region of the main body. In addition, the first fluid medium can include fossil fuels or exhaust gasses. The second fluid medium can include a disinfectant, liquid catalyst, water, cleaning solution, or any process liquid treatment solution.

In another aspect of the disclosure described herein, a method of cleaning fluids is disclosed. The method can include receiving a first fluid medium comprising pollutant particles via an inlet coupled to a main body and directing a second fluid medium through a nozzle within the main body. In addition, the method can include directing the first and second fluid mediums through a cylindrical body or hydro vortex generator within the main body comprising a plurality of horizontally positioned rods projecting therefrom, wherein the cylindrical body can further include a plurality of openings. The method can also include rotating the cylindrical body with a motor such that the first and second fluid mediums are directed through the cylindrical body. The method may also include receiving pollutant particles from the first fluid medium at a first area within the main body and directing the received pollutant particles through a first outlet out of the main body. In addition, the method can further include receiving the pollutant particles within a particle absorbing media. The method can also include directing the fluid medium through a process chamber. In addition, the process chamber can include a spiral or helical configuration. The method may also include directing the fluid medium through a second outlet coupled to the process chamber.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

Figure 1:
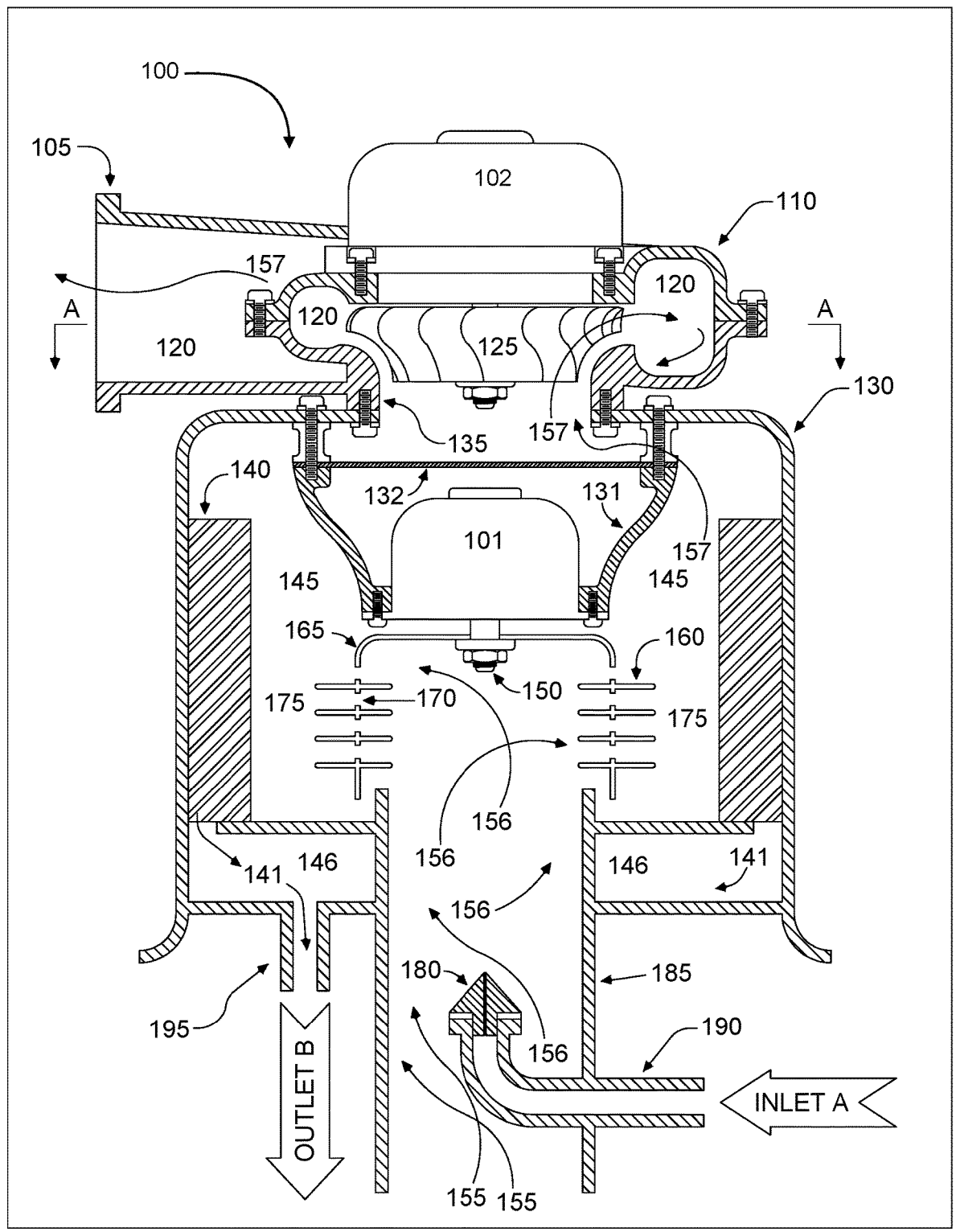
FIG. 1 illustrates one non-limiting exemplary embodiment of a partial cross-sectional view of the hydro-active scrubber and reactor (HSR) system and apparatus of the disclosure described herein.

FIG. 1 illustrates one non-limiting exemplary embodiment of the hydroactive scrubber and reactor (HSR) system, method, and apparatus of the disclosure described herein. Here, it is contemplated within the scope of the present disclosure described herein that HSR 100 can be configured or adapted to operate as a scrubber or a reactor, or both, with respect to effluent gases, wherein treated gas exits the device and liquid waste can be drained from the device to be treated. Here, HSR 100 (operating as a scrubber) is shown having a lower fluid flow inlet or intake duct 185 with effluent or pollutant gasses 155 flowing therethrough and into HSR 100. Here, duct 185 can be mounted to housing 130 and further enclose therein injector nozzle 180. Here, nozzle 180 may be configured to receive a fluid medium via inlet A at inlet port 190 and sprayed through nozzle 180 into the fluid flow stream 155. Specifically, injector nozzle 180 can be configured to emit droplets ranging from about 5 microns to 11,000 microns. Here, the fluid medium sprayed via nozzle 180 works to scrub or react with fluid flow stream 155 and changing 155 into a mixed fluid stream 156 (fluid medium from nozzle 180 mixed with gasses 155). Here, the mixed flow stream 156 can then be acted upon by a rotating hydro-active vortex generator component 165 coupled to an element drive motor 101 via shaft 150. Here, motor 101 is further mounted within sub-housing 131 below a moisture barrier or moisture shield 132.

Figure 3:
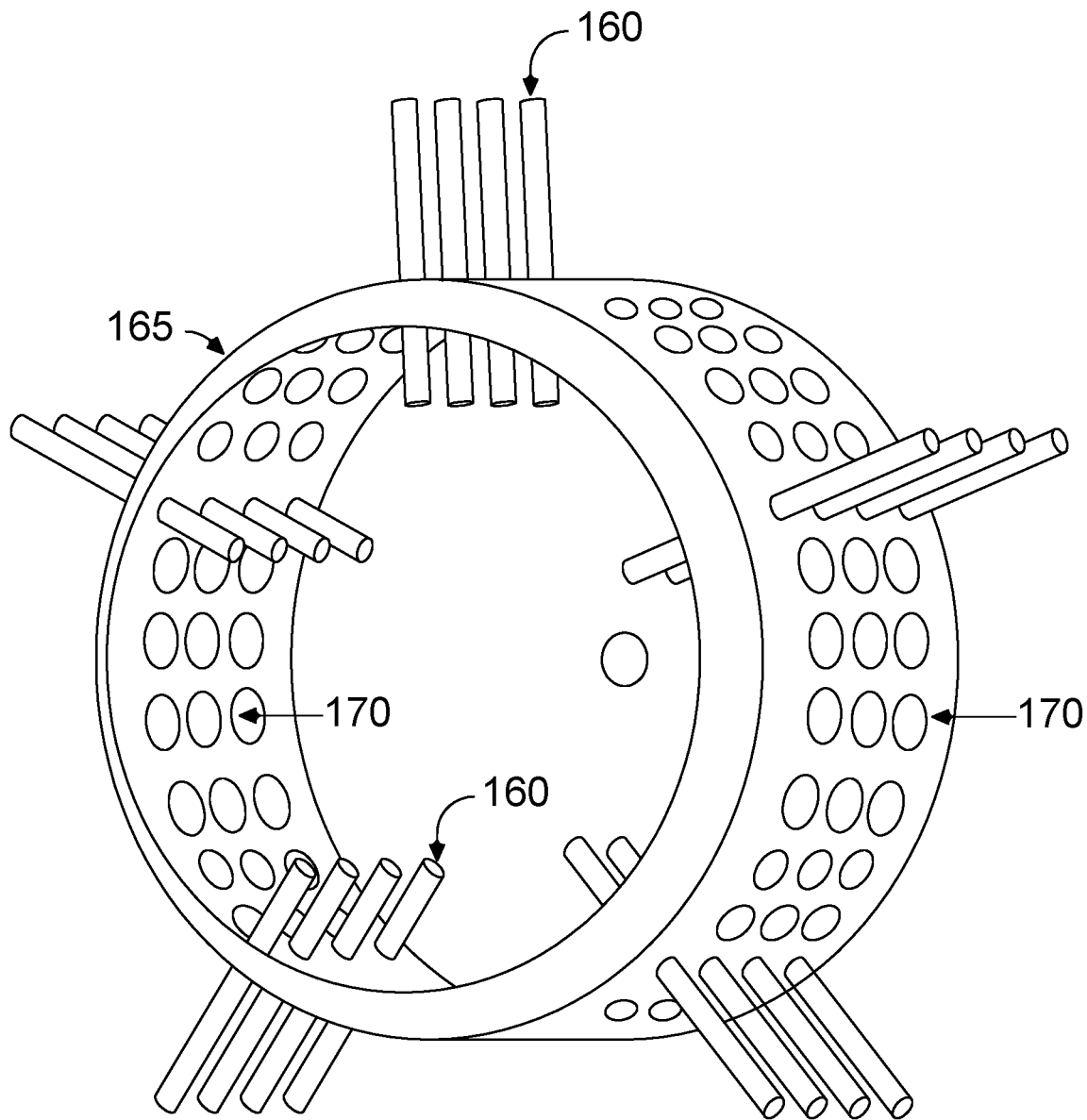
FIG. 3 illustrates a perspective view of a hydro-active vortex generator component of the HSR of the disclosure described herein.
Figure 4:
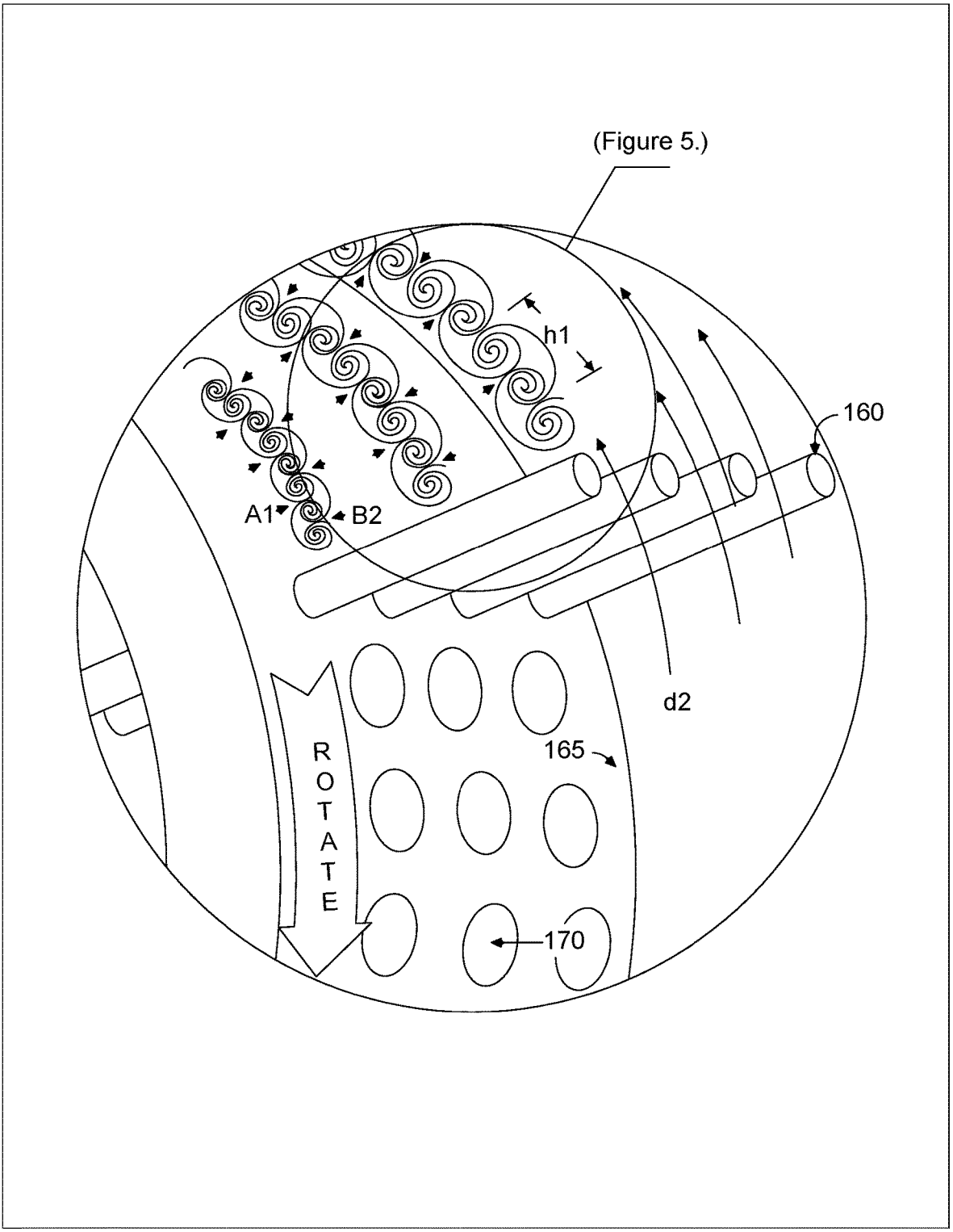
FIG. 4 illustrates a simplified partial close-up perspective view of the hydro-active vortex generator component illustrating a generated vortex street.

Still referring to FIG. 1, mixed flow 156 can then be acted upon by rods 160 mounted to the inside surface and outside surface of the hydroactive vortex generator component 165. Here, rods 160 move (via 165) at a high angular velocity to generate harmonic vortices that entrain and concentrate the heavier bulky elements of the mixed fluid flow 156. At rods 160, the concentrated mixed fluid flow 156 is rotated at high speed and ejected through apertures 170, wherein apertures 170 are positioned throughout the periphery of the cylindrical portion of the hydro-active vortex generator component 165, as also shown in FIGS. 3-4. After being ejected through apertures 170, the mixed flow 156 is then fed into a crossflow region 170 where it can then impact, or be received by, an absorbing media 140. Here, media 140 may be any type of fluid absorbing material, including but not limited to, steel grid, sand, sponge, cellulose, pellets, or loosely bound polymers, among others. Further media 140 can provide a dead-air space and opening below it whereby process liquids or fluids 141 may be drained into collection chamber 146, which can then be further drained through Outlet B via port 195 without being acted upon by spurious air currents.

Still referring to FIG. 1, the cross-flow region is one important feature of the disclosure described herein as this area is where the liquid constituent of the mixed fluid flow 156 is trapped in the absorbing media 140 where process liquids 141 are drained out of the HSR via port 195 to be removed and treated. Here, the drained liquids 141 and treated fluid flow 157 can be further drawn into a spiral or helical process chamber 145 and into the inlet 135 via process fan 125. Here, process fan 125 can be coupled to and driven by motor 100 which can be further coupled to motor 102 which is mounted on process fan housing 110. Here, it is contemplated within the scope of the disclosure described herein that the process fan 125 may have its own independent motor, such as motor 101, or be also driven by motor 102, in addition to or in lieu of motor 101. From fan 125, the treated fluid flow 157 then travels through duct 120 within the process fan housing 110 and exits through process exhaust duct outlet 105, wherein outlet 105 can have flanges for connecting with additional ducting.

Figure 2:
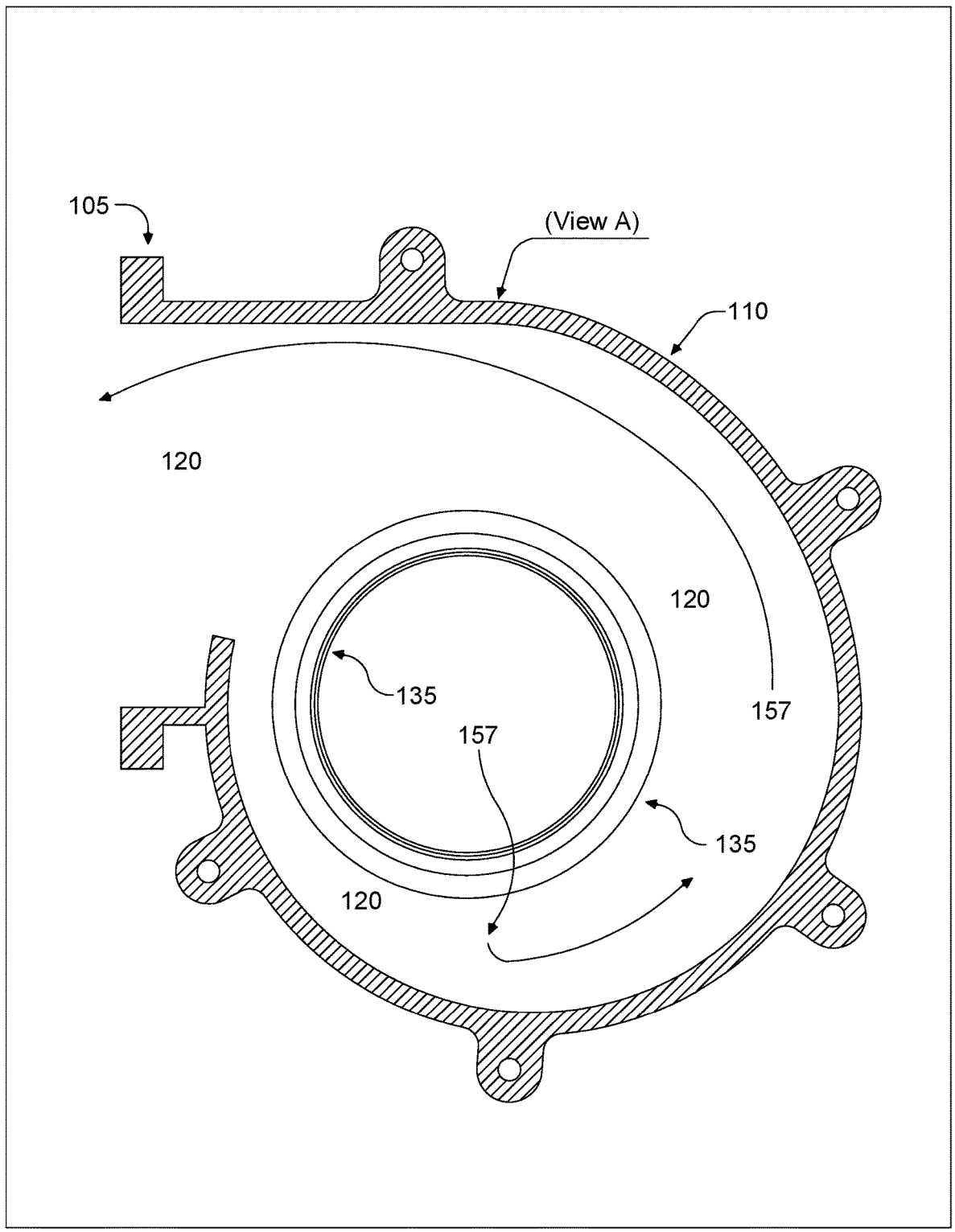
FIG. 2. illustrates a cross-sectional top view of a fan and housing duct for the HSR of the disclosure described herein.

FIG. 2 illustrates a cross-section top view of duct 120. Here, flow 157 may exit into the atmosphere via outlet 105, or in the alternative, outlet 105 may be connected to another HSR system and apparatus for additional or a more refined scrubbing or reacting process. Specifically, two or more HSR devices or systems can be connected to each other in series or parallel performing work on one type of fluid gas or each receiving a fluid gas at each of their inlet ducts 185. Alternatively, each HSR device or system may receive alternative types of fluids via inlet A at inlet port 190 for different types of scrubbing and reacting process on the same fluid gas 155 or different gasses, pollutants, or contaminants.

Figure 7:
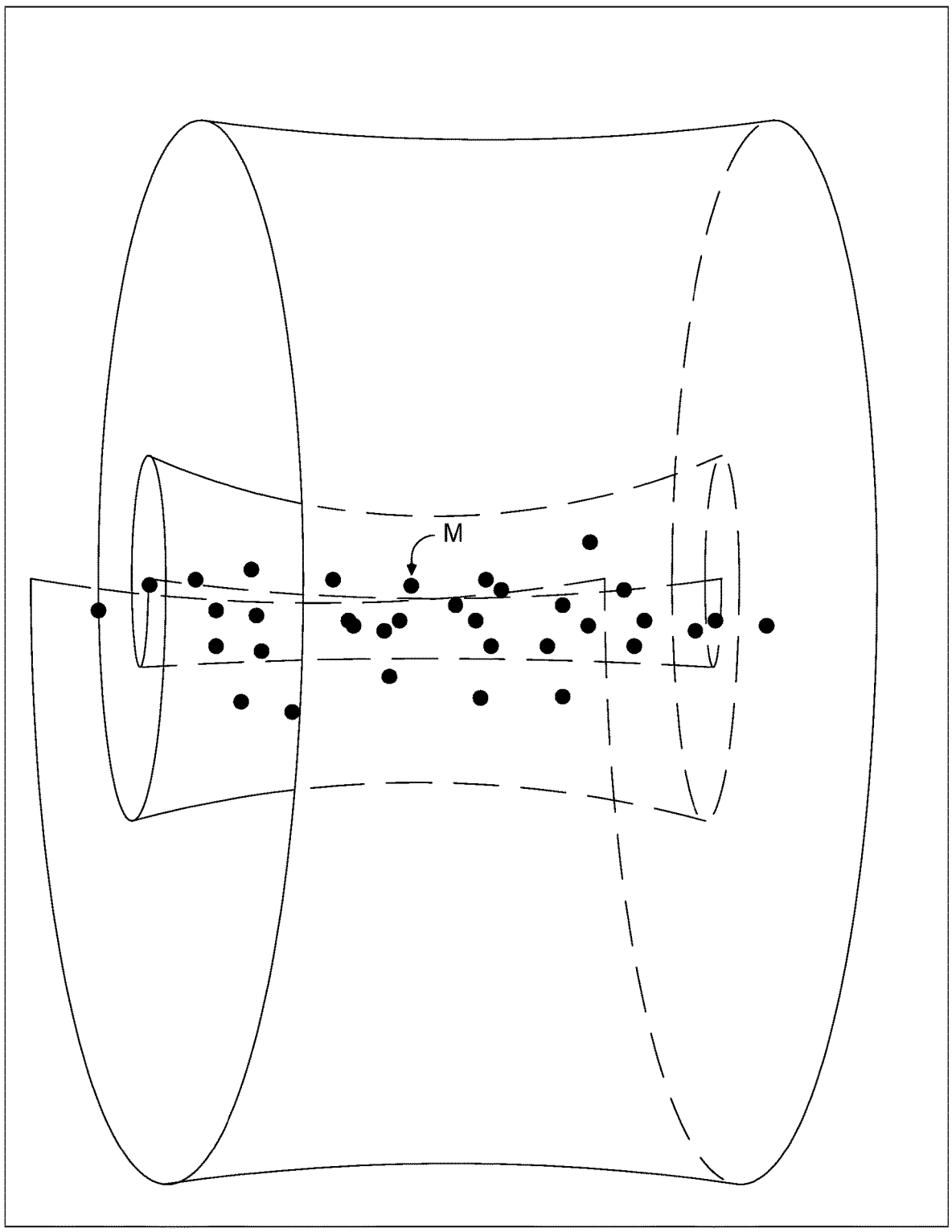
FIG. 7 illustrates a simplified close-up side view of one non-limiting exemplary embodiment of a free declining vortex without an energy input, and fluid particles moving towards the center axis of the vortex.

Referring to FIGS. 3-7, a Von Karmen Vortex Street can form as mixed gasses leaving apertures 170 and traveling in direction d2 (FIG. 4) and passing by a bluff-body such as rods 160 produce equidistant low-pressure zones h1. Here, zones h1 are bounded by alternating directional flows A1 and B2, wherein the process has many attributes, namely, for counting units of flow based on certain design features of the bluff-body, the fluids Strouhal number, and various other control features. For example, a useful attribute is that the intermittent vortex passes between a driven state (FIG. 6) and a free state (FIG. 7) from a working range of three up to thousands of times per second. Here, the reference to "M" in the figures can refer to the contaminant or pollutant particles within the fluid gasses. The vortex that harmonically terminates about a linear shaped bluff-body, such as rods 160, generates a laminar flow wrapped into a helix or vortex. The vortex generated by the bluff-body, or rods 160, is also cylindrical in shape following the contour of the control shape of the bluff-body or rods 160. The harmonic vortex creates alternating flows, as shown by arrows A1, and B2 in FIG. 4, shifting between states of high energy (FIG. 6) and low energy (FIG. 7). This shift between states of high and low energy may be used to do valuable work.

Figure 5:
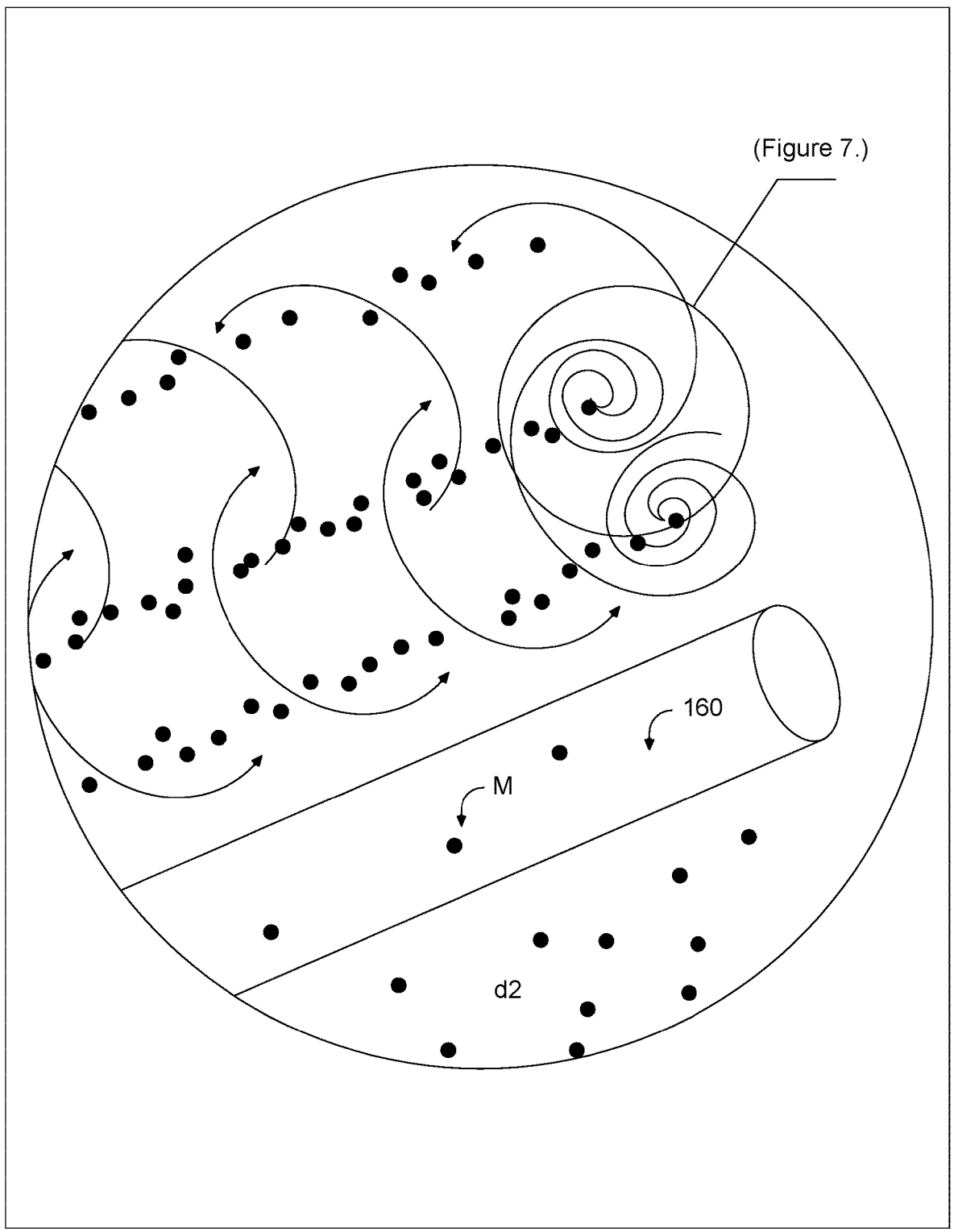
FIG. 5 illustrates a simplified close-up perspective view of the vortex concentrated fluid particles.
Figure 6:
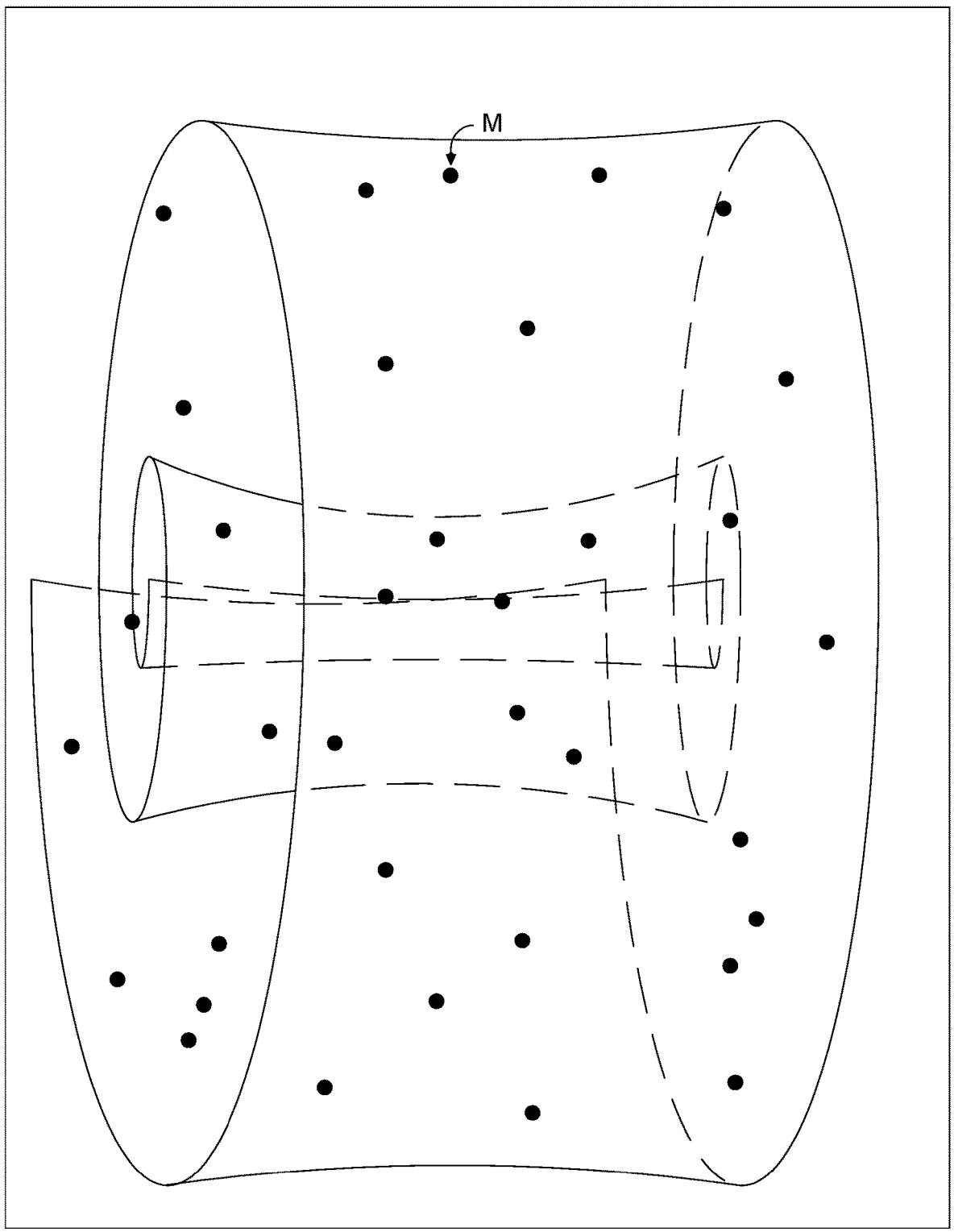
FIG. 6 illustrates a simplified close-up side view of one non-limiting exemplary embodiment of a driven vortex illustrating how fluid particles are spread throughout the vortex.

Here, the hydroactive vortex generator component 165 uses a different method than conventional scrubbers or reactors. For example, at least one of the objectives of the hydroactive vortex generator component 165 is to produce a harmonic vortices with its rotating rods 160 that act upon the liquid portion of the mixed flow. Further, when the vortex shears from the trailing edge of rods 160, it becomes a free vortex that is declining (declining in angular velocity and intensity), as shown in FIG. 7. Specifically, evenly dispersed liquid media in a vortex without the energy input begins to form columns of concentrated liquid media along a central vortex axis, as shown in FIGS. 4, 5, and 7. This forms the basis of the vortex becoming hydroactive as the liquid droplets M in (FIG. 6) are homogenously mixed throughout the driven vortex. Here, the moment the vortex begins to shear away from the edge of rod 160, as shown in FIG. 6, they begin to immediately take the form of a free declining vortex, as shown in FIG. 7. Specifically, the energy from the vortex, while it is driven, gets transferred into the liquid particles and when energy is removed from the vortex, a tight or cohesive concentrated column of liquid droplets M gravitate to a position of lower kinetic energy along the vortex axis, as shown in FIGS. 5 and 7.

Still referring to FIG. 3-7, the mixed fluid flow particles can then be concentrated along the axis of the vortex at a rate consistent with the physical properties of the control element 160 shape and confines of the operating space. Further, the angular velocity imparted by the rotation of the hydroactive vortex generator element 165 accelerates the liquid to a much higher velocity which aids in the effective removal of the liquid from the gas flow stream into the absorbing media 140. On the hydroactive vortex generator component with control shapes rods 160 radially mounted on the inner and outer surface of the drum acting as bluff bodies, the particles travel in a semi-helical pattern, oscillating hundreds or thousands of times per second. The mixed flow particles are acted upon by the hydroactive vortex generator component 165 slightly longer (than the same path without it). Here, the action of the harmonic vortex acts as a pneumatic grip forcing the maximum amount of energy to transfer into the mixed flow particles ejecting them directly into the absorbing media 140 to be removed from the flow stream. This process is ultimately suited for applications in mixing gases, scrubbing fluids from gasses, reacting with fluids or gasses, disinfecting gases, or removing disinfectant from gasses.

The following is one sample experiment and testing data associated with the hydroactive vortex generator of the disclosure described herein. Specifically, with the hydroactive vortex generator operating at a 1000 CFM suction fan flow rate the testing conditions and results included the hydroactive vortex generator having a ¼ GPM nozzle @ 900 PSI loading inlet successfully for 5 minutes without overburden laden exhaust developing, a ⅓ GPM nozzle @ 900 PSI loading inlet successfully for 5 minutes without overburden laden exhaust developing, a ½ GPM nozzle @ 900 PSI loading inlet successfully or 5 minutes without overburden laden exhaust developing. In addition, at the 1000 CFM suction fan flow rate, the testing conditions and results also included the hydroactive vortex generator having a 1 GPM nozzle @ 900 PSI loading the inlet successfully for 45 seconds without overburden laden exhaust developing, a 2 GPM nozzle @ 900 PSI loading the inlet successfully for 15 seconds without overburden laden exhaust developing. Further, at a 500 CFM suction flan flow rate. Further, at a 500 CFM suction fan flow rate, the testing conditions and results included the hydroactive vortex generator having a 1 GPM nozzle @ 900 PSI loading the inlet successfully for 93 seconds without overburden laden exhaust developing, and a 2 GPM nozzle @ 900 PSI loading the inlet successfully for 40 seconds without overburden laden exhaust developing.

From the foregoing it will be seen that the present disclosure described herein is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts described herein, except insofar as such limitations are included in following claims. Further, it will be understood that certain features and sub-combinations are of utility and may be employed without reference to other features and sub-combinations. This is contemplated by and is within the scope of the claims.

What is claimed is:

1. A fluid cleaning apparatus, comprising:

a main body;

an inlet configured to receive a first fluid medium comprised of pollutant particles;

a nozzle configured to dispense a second fluid medium within the main body;

a cylindrical body within the main body comprising a plurality of horizontally positioned rods projecting therefrom, wherein the cylindrical body further comprises a plurality of openings;

a motor configured to rotate the cylindrical body thereby directing the first and second fluid mediums through the cylindrical body;

a first area within the main body for receiving the pollutant particles from the first fluid medium; and a first outlet configured to direct the received pollutant particles out of the main body.

2. The fluid cleaning apparatus of claim 1, wherein the cylindrical body comprises an interior open space, and wherein the rods further project within the interior open space of the cylindrical body.

3. The fluid cleaning apparatus of claim 1, wherein the first area further comprises a particle absorbing media.

4. The fluid cleaning apparatus of claim 1, further comprising a fan configured to direct the fluid medium through a process chamber.

5. The fluid cleaning apparatus of claim 4, wherein the process chamber comprises a spiral or helical configuration.

6. The fluid cleaning apparatus of claim 5, further comprising a second outlet coupled to the process chamber configured to direct the fluid medium through the second outlet.

7. The fluid cleaning apparatus of claim 6, wherein the second outlet is further connected to another fluid cleaning apparatus in series or in parallel.

8. The fluid cleaning apparatus of claim 1, wherein the motor and cylindrical body are suspended from an upper region of the main body.

9. The fluid cleaning apparatus of claim 1, wherein the first fluid medium is comprised of fossil fuels or exhaust gasses.

10. The fluid cleaning apparatus of claim 1, wherein the second fluid medium is comprised of a disinfectant, liquid catalyst, water, cleaning solution, or any process liquid treatment solution.

11. A method of cleaning fluids, comprising:
   receiving a first fluid medium comprising pollutant particles via an inlet coupled to a main body;
   directing a second fluid medium through a nozzle within the main body;
   directing the first and second fluid mediums through a cylindrical body within the main body comprising a plurality of horizontally positioned rods projecting therefrom, wherein the cylindrical body further comprises a plurality of openings;
   rotating the cylindrical body with a motor such that the first and second fluid mediums are directed through the cylindrical body;
   receiving pollutant particles from the first fluid medium at a first area within the main body; and
   directing the received pollutant particles through a first outlet out of the main body.

12. The fluid cleaning apparatus of claim 11, further comprising receiving the pollutant particles within a particle absorbing media.

13. The fluid cleaning apparatus of claim 11, further comprising directing the fluid medium through a process chamber.

14. The fluid cleaning apparatus of claim 13, wherein the process chamber comprises a spiral or helical configuration.

15. The fluid cleaning apparatus of claim 14, further comprising directing the fluid medium through a second outlet coupled to the process chamber.

\* \* \* \* \*